United States Patent [19]

Bahle

[11] 4,445,148

[45] Apr. 24, 1984

[54] AUTOMATIC TELEPHONE ANSWERING APPARATUS

[75] Inventor: Otto G. Bahle, Gauting, Fed. Rep. of Germany

[73] Assignee: Compur-Electronic GmbH, Munich, Fed. Rep. of Germany

[21] Appl. No.: 331,733

[22] Filed: Dec. 17, 1981

[30] Foreign Application Priority Data

Dec. 19, 1980 [DE] Fed. Rep. of Germany ....... 3047918

[51] Int. Cl.³ ............................................. H04M 1/64
[52] U.S. Cl. ..................................... 360/12; 179/6.14; 179/6.13
[58] Field of Search ................ 179/6.14, 6.13; 369/50; 360/12, 69, 74.2, 74.4, 74.1, 72.1, 72.2, 72.3

[56] References Cited

U.S. PATENT DOCUMENTS

| 4,032,712 | 6/1977 | Catto | 360/74.4 |
| 4,048,659 | 9/1977 | Fink | 360/12 |
| 4,092,680 | 5/1978 | Sander | 360/72.3 |
| 4,150,405 | 4/1979 | Sato | 360/72.3 |

FOREIGN PATENT DOCUMENTS

| 961186 | 1/1975 | Canada | 179/6.13 |
| 2205919 | 4/1976 | Fed. Rep. of Germany | 179/6.13 |
| 1388037 | 3/1975 | United Kingdom | 179/6.13 |

Primary Examiner—Alan Faber
Attorney, Agent, or Firm—Townsend and Townsend

[57] ABSTRACT

For switching over from playback of the owner's announcement text to recording a message from a caller, a pause of defined length is present on the announcement tape between the first and second (or end) parts thereof. This pause is recorded and on every run of the announcement tape through the apparatus the reading, recorded for the length, undergoes comparison with the pause of the announcement tape being transported. When the two values are the same, switch over takes place. In this way, it is possible to make certain of switch over without being dependent on the tape speed, and the circuit system may be made very much less complex.

14 Claims, 2 Drawing Figures

AUTOMATIC TELEPHONE ANSWERING APPARATUS

BACKGROUND OF THE INVENTION

The present invention is with respect to a method and a circuit system for the automatic switching over from the playback of an announcement text to storing a message from a caller in an automatic telephone answering apparatus having an announcement unit with an announcement tape and a message recording unit with a message recording tape for incoming messages.

A circuit system on these lines has been put forward in the prior art, see German Auslegeschrift specification No. 2,205,919. In this known circuit a switch over signal is produced, it being recorded after the announcement text on the announcement tape and having to be different to the speech signals. On the receipt of an incoming call, the announcement tape is played back and the switch over signal made out with a specially designed detector circuit. Dependent on triggering of the detector circuit by the switch over signal, there is then an automatic switch over from the playback of the announcement text to recording of the incoming message. In this known circuit, the system in it for producing a switch over signal and for making out the switch over signal on playback is undesirably complex, a signal generator for producing a certain switch over signal and a filter for use in detecting the switch over signal on playback being necessary. What is more, it is important that the tape be transported at the same, unchanging speed on recording and playback of the switch over signal, because the frequency is important for detecting the switch over signal.

For this reason, one may not be certain of being able to make out the switch over signal or, if certain detection is desired, the filters, for example, have to be within a tight tolerance range.

GENERAL OUTLINE OF THE INVENTION

For this reason, one purpose of the present invention is that of designing a method and a circuit system of the sort noted at the start, which makes possible automatic switch over from the playback of the announcement text to the recording of the message using a simple apparatus which is, nevertheless, troublefree and certain in operation, an unchanging or defined tape speed not being very important.

For effecting this purpose and further purposes in the method of the invention, a first pause of a defined length is kept free (it being produced, for example by erasing the tape) on the announcement tape after a first part of the announcement text and before the end part of announcement text, the announcement tape is automatically played back on turning on the telephone answering apparatus and/or putting the announcement tape into it, on which event the pause of defined length is detected by a speech detector and the start of the pause is stored, on playback of the announcement text on receipt of a call, a comparison is undertaken between the running of the announcement text and the stored or recorded start of the first pause and, if they are in agreement with each other, switching over to message recording takes place.

A circuit system designed for effecting the said and other purposes is characterized by an announcement tape, which after the announcement text and before the end part of the announcement text has a first pause of a defined length, a speech detector which on turning on the telephone answering apparatus and/or putting in the announcement tape and automatic playback of the same taking place at the same time, makes out the first pause of defined length and the start thereof, a store for recording or storing the first pause, and a comparison unit which, on playback of the announcement text made on receipt of a call, undertakes a comparison between the running of the announcement tape and the stored or recorded start of the first pause, and if the two are in agreement with each other, is responsible for producing an output signal for automatic switch over to message recording.

In the method and circuit system of the present invention, the condition or event responsible for causing switch over, is a defined pause or the position of a defined pause on the announcement tape, which may simply be read, the outcome being a very troublefree and certain switch over without the tape speed being very important. Furthermore, in the method and circuit system of the present invention, no special circuit parts are needed for producing switch over signals and no circuit parts such as filters or the like are needed for making out the switch over signal on playing back the announcement tape so that the circuit is very much less complex.

A condition for the approval by public authorities of telephone answering apparatus is that the announcement tape be automatically played bck so that the announcement on it may be listened to by the owner on putting in or changing the announcement tape cassette or on switching on the telephone answering apparatus or, in other words, the announcement tape is automatically played back on turning on the telephone answering apparatus or on putting in an announcement cassette or changing it. On such playback, the start of the first pause may be very simply made out. To be quite certain that in fact it is the first pause which has been made or or detected and not a chance pause produced within the body of the announcement text, the first pause has a defined length of for example 4 seconds. Pauses of such a length are not allowed, so that if on playback of the announcement tape a pause with the defined length is produced, the start of this pause is stored or recorded.

After the telephone answering apparatus has been made ready for operation and a call comes in, the announcement tape is played back for the caller. When this takes place, a comparison is made between the announcement text and the stored or recorded start of the first pause and if an agreement or coincidence is made out or detected, a switch over signal is produced going to the recording unit for starting it for recording the incoming message.

As part of a preferred working example of the method of the invention the announcement tape has, coming after the first pause with a defined length, a speech block of defined length having the end part of the announcement text, the defined length of this speech block with the end part of the announcement text being used to make even more certain of detecting the first pause in all cases, more specially in view of the fact that it would be possible for a change pause (not allowed under telephone regulations) to be present in the announcement text with the same length as the first pause. Because of the defined length of the speech block with the end part of the announcement text, one may be even more certain of making out the first pause and, for this reason, the start of the first pause, that is to say the end of the announcement text.

In order to be even more certain of making out or detecting the end of the announcement text at the start of the first pause, as part of a further development of the invention after the speech block having the end part of the announcement text, it is possible to have a second pause with a defined length on the message tape.

The start of the first pause is detected, as part of a preferred form of the invention, by timing it and the time is recorded. This record of the time then undergoes comparison in time on playing back the announcement text. In the circuit system of the present invention, for this reason, there is a timer or time measuring unit for timing (that is to say making out the time of) the start of the first pause.

In further possible form of the method of the invention, the start of the first pause is made out by a tape counter, that is to say by measuring tape lengths or tape transport, the count of the tape counter answering to the start of the first pause is stored or recorded. In the circuit system of the invention, use is made, for this purpose, of the tape counter which, in any case, has to be present (so that the owner may see if the tape has broken or become tangled) for meeting the rules of public telephone authorities.

Because of the use of a tape counter, the answering apparatus is in no way dependent on the tape speed.

As part of a further preferred working example of the invention the tape counter reading or count for the start of the first pause or the time taken before the start of the first pause after the announcement text or, as the case may be, after the second tape pause, having a defined length, is recorded on the announcement tape. On playback of the announcement tape, which in any case has to take place on turning on the telephone anwering apparatus or putting in a (different) announcement tape cassette, this recording (of the tape count or the time) may be read and used later.

LIST OF FIGURES

An account will now be given of the invention, by way of example, using the figures, in more detail.

Figure 1:
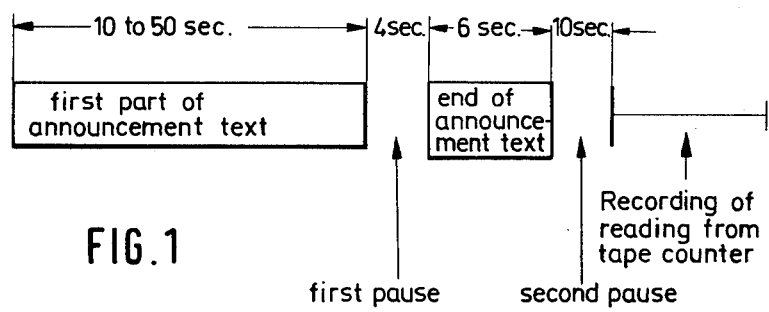
FIG. 1 is a diagrammatic view of an announcement text with defined pauses on the announcement tape.

As will be seen from FIG. 1 the announcement text on the announcement tape is started off with a first part with a length of for example 10 to 50 seconds, after which there is a first pause with a defined length of, for example, 4 seconds. Nextly, after the first pause, there is a speech block of defined length having the second part of the announcement text having a length for example of 6 seconds at the most. After this speech block with the second or last part of the announcement text and having a defined length there is a second pause of defined length, for example of 10 seconds. Lastly, after the second pause, the count of the tape counter at the start of the first pause may be recorded.

Figure 2:
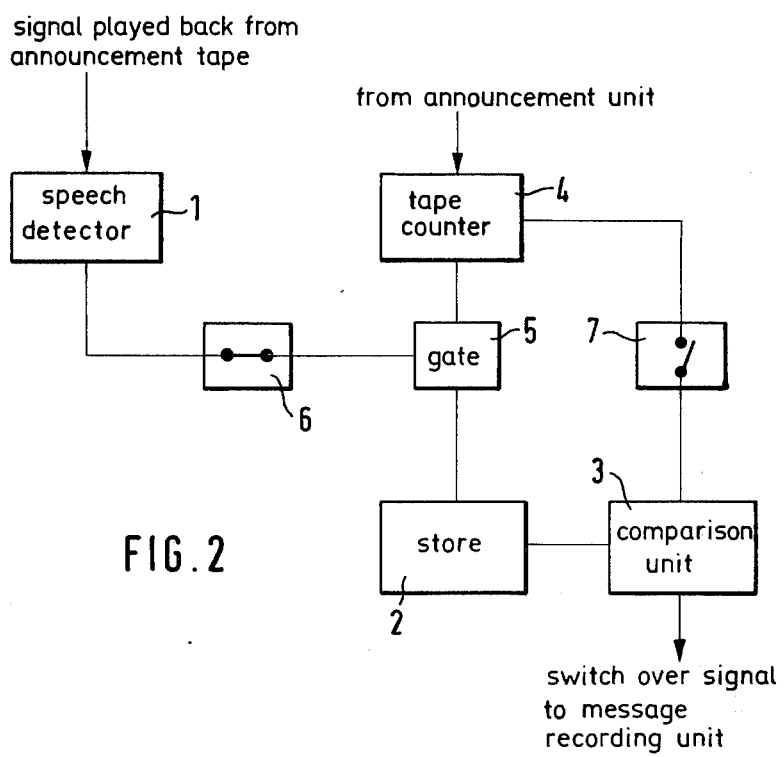
FIG. 2 is a diagram of a working example of the circuit of the present invention.

FIG. 2 is a diagrammatic view of an example of the circuit system of the present invention.

On playback of the announcement tape so that it may be gone over by the owner of the apparatus, that is to say (to be in line with the rules of public authorities) every time the apparatus is turned on or a (different) announcement tape is put in, the signal, read by way of a magnetic head (not figured) from the announcement tape, goes to a speech detector 1 which is responsible for producing an output signal every time that the speech detector 1 makes out the start of the first pause, such output signal turning on gate 5. On playback of the announcement tape for review by the owner, a switch 6 joining the speech detector 1 with the gate 5 is in the turned on condition. At the same time, a tape counter 4 is in operation for measuring the length transported of the announcement tape, the tape counter 4 being joined up with the announcement unit for this purpose. On gate 5 being turned on, that is to say on speech detector 1 detecting or making out the start of the first pause, the reading of counter 4 goes to store 2, in which this counter reading or count (that is to say answering to the start of the first pause) is stored or recorded. In connection with the speech detector 1, it is possible to have a circuit stage (not figured) to make certain that the reading of tape counter 4 is only stored in store 2 when it is quite certainly a question of the start of the first pause and not the start of any chance pause in the announcement test or some other form of pause. To this end, the announcement tape is completely played back and taking into account the pauses of defined length and the speech block with the second part of the announcement text, tests are undertaken to make quite certain that it is only at the start of the first pause that gate 5 is turned on or put into the conducting condition.

After the end of the playback of the announcement text for review as needed under public authority regulations, the reading of the counter at the start of the first pause is read into store 2. If, in an other possible form of the invention, the counter reading at the start of the first pause has been recorded at the end, this counter reading will be read in the store 2 on review playback.

If in the read-for-operation condition of the answering apparatus only one call comes in, the announcement tape is played back and the first part thereof is played over to the caller through the telephone line, tape counter 4 at the same time counting the tape and giving a reading for the tape transported in a given time, such reading going, when switch 7 is turned on (the switch being turned off on review playback of the announcement tape) to a comparison unit 3 for comparison with the counter reading at the start of the first pause, such reading being stored in store 2. When the changing count of tape counter 4 gets to a value which is the same as the counter reading (stored in store 2) answering to the start of the first tape pause, that is to say when the start of the first pause on playback of the announcement text has been got to on receipt of a telephone call, a switch over signal is produced by comparison unit 3, such signal going to the recording unit and putting it into operation so that the message coming by way of the telephone line from the caller may be recorded on the message record tape.

To make it clear to the caller that the time has come for his message to be recorded, it is possible for a sound signal to be produced by a generator, although this is not completely necessary. In any case, this further sound signal would not be recorded or used for switching over from playback of the announcement text to message recording.

In place of the tape counter 4, it is possible, in a further possible form of the invention, to have a timer for measuring the time. However, this would not be responsible for any change in the method of the invention and the function of the circuit thereof.

While it is true that details have been given of one preferred working example of the method and circuit system of the present invention, those trained in the art will be in a position of working out many changes and further developments without giving up the main teaching of the invention.

I claim:

1. A method for automatic changeover from announcement text playback to recording a message of a caller in an automatic telephone answering apparatus having an announcement unit with an announcement tape and a message recording unit with a message recording tape for recording incoming messages, the invention residing in the steps of:
   recording a first announcement text pause of defined length on the announcement tape after a first information part and before a conclusion part of the announcement text;
   detecting on playback of the announcement tape for review purposes said first pause of defined length with a speech detector;
   storing the start location of the detected pause;
   comparing on playback of the announcement text on receipt of an incoming call the transport of the anouncement tape with the start location of the first pause; and
   switching over for message recording when values for tape transport and for the stored start location of the first pause are the same.

2. A method as claimed in claim 1, wherein such review playback takes place automatically on turning on the answering apparatus.

3. A method as claimed in claim 1 or claim 2, wherein said review playback takes place automatically on putting said announcement tape on said answering apparatus.

4. A method as claimed in claim 1, further comprising the step of recording on said announcement tape after the first pause a speech block of defined length including a conclusion part of the announcement text.

5. A method as claimed in claim 4, further comprising the step of recording after said announcement text speech block conclusion part a second pause of defined length on said announcement tape.

6. A method as claimed in claim 5, further comprising the step of recording the start of the first pause on the announcement tape at a location after the second pause on said tape.

7. A method as claimed in claim 1 or claim 4, further comprising the step of recording the first pause on the announcement tape after the conclusion part of the announcement text.

8. A method as claimed in claim 1, claim 4, or claim 7, further comprising the steps of:
   timing the start of the first pause for producing a time reading;
   storing such time reading; and
   comparing said stored time reading with the transport location of the announcement tape.

9. A method as claimed in any one of claims 1, 4, or claim 7, further comprising the steps of:
   counting a counter to produce a count for the start of the first pause on said announcement tape;
   storing such count in the form of a counter reading; and
   comparing tape length values with said stored count.

10. In a circuit system for the automatic change over from announcement text playback to recording the message of a caller in an automatic telephone answering apparatus having an announcement unit with an announcement tape and a message recording unit with a message recording tape for recording incoming messages, the invention residing in that said apparatus comprises:
    an announcement tape having a first pause of defined length located on said tape before a conclusion part of said announcement text and after a first information part of said text;
    a speech detector for making out the first pause of defined length and the start location thereof on review playback of the announcement tape;
    a store for storing a reading for the start location of the first pause; and
    a comparison unit for undertaking, on playback of announcement text on receipt of an incoming call, a comparison between the transport of the anouncement tape and the stored reading for the start location of the first pause, and when a reading representative of tape transport and a stored reading representative of the start location of the first pause are the same, for producing an output signal for automatic switching over to message recording from the caller.

11. A circuit system as claimed in claim 10, designed for automatically playing back said announcement tape for review purposes on turning on said apparatus.

12. A circuit system as claimed in claim 10 or claim 11, designed for automatically playing back said announcement tape for review purposes when said announcement tape is put in said apparatus.

13. A circuit system as claimed in claim 10 having a tape counter for giving a reading representative of the start location of the first pause.

14. A circuit system as claimed in claim 10, having a timer for producing a time reading representative of the start location of the first pause.

* * * * *